United States Patent [19]
Ciccarelli et al.

[11] 3,734,524
[45] May 22, 1973

[54] SHOCK SKID ASSEMBLIES FOR SHELTER UNITS

[75] Inventors: William E. Ciccarelli; Phillip A. Kaufman, both of York, Pa.

[73] Assignee: Gichner Mobile Systems, Inc., Dallastown, Pa.

[22] Filed: Feb. 17, 1971

[21] Appl. No.: 116,135

[52] U.S. Cl. ................................280/25, 188/129
[51] Int. Cl. ....................................B62b 17/04
[58] Field of Search ..............280/25; 248/22, 20, 248/21; 188/129, 1 B

[56] References Cited

UNITED STATES PATENTS 3,514,122   5/1970   Corsetti..........................280/25
3,105,697   10/1963  Weaver..........................280/25

Primary Examiner—Leo Friaglia
Assistant Examiner—Robert R. Song
Attorney—Clarence A. O'Brien and Harvey B. Jacobson

[57] ABSTRACT

A shelter unit having a plurality of longitudinally extending shock absorbing skid assemblies mounted thereon for protecting internally mounted delicate equipment from excessive shock such as may occur when the shelter unit experiences rough handling during transport or deployment which frequently is by helicopter drop. Each shock absorbing skid assembly employs relatively movable channel-shaped members spaced apart by a plurality of cylindrical shock absorbing elements.

10 Claims, 6 Drawing Figures

PATENTED MAY 22 1973

William E. Ciccarelli
Phillip A. Kaufman
INVENTORS

BY Clarence A. O'Brien
and Harvey B. Jacobson
Attorneys 3,734,524

William E. Ciccarelli
Phillip A. Kaufman
INVENTORS

BY Clarence A.O'Brien
and Harvey B. Jacobson
Attorneys

SHOCK SKID ASSEMBLIES FOR SHELTER UNITS

BACKGROUND OF THE INVENTION

1. Field of the Invention

The present invention generally relates to a shock absorbing assembly for shelter units such as those employed for housing electronic equipment or similar equipment that is sensitive to excessive shock. The shock absorbing assembly is in the form of a plurality of skids mounted longitudinally on the bottom surface of a shelter unit with each skid including relatively movable members that are interconnected for limited vertical movement and a plurality of cushioning elements in the form of horizontally disposed cylindrical tubes oriented in side-by-side contacting relation to resiliently space the members apart and cushion the relative movement of the members toward each other thereby cushioning any shock that would normally be transmitted to the shelter unit and the equipment contained therein.

2. Description of the Prior Art

Many transporting units have been provided for conveying and housing various types of equipment. Some efforts have been made to provide shock absorbing skids for such equipment. One example of such a skid is disclosed in U.S. Pat. No. 3,514,122 issued May 26, 1970 in which the skid element is in the form of a relatively large block of compressible resilient foam plastic material. While such previously known devices perform with varying degrees of efficiency, there are many circumstances encountered in which the inherent weaknesses of a body of foam plastic material result in failure or inoperativeness of the shock absorbing skid.

SUMMARY OF THE INVENTION

An object of the present invention is to provide a shock absorbing skid assembly for mounting on the bottom surface of a shelter unit, container or the like which will effectively absorb shock and protect the equipment or material within the shelter unit or container from damage due to excessive shock being transmitted thereto.

Another object of the invention is to provide a shock absorbing skid assembly incorporating relatively movable members guided in relation to each other for limited relative movement and a plurality of deformable cylindrical tubes disposed in contacting side-by-side relation and extending transversely of the relatively movable members for cushioning and absorbing shock imparted to one of the movable members so that it will not be transmitted to the other movable member.

Yet another object of the invention is to provide a shock absorbing skid in accordance with the preceding objects in which the hollow tubes or shock elements constructed of glass fiber reinforced plastic material in contacting engagement with each other so that the cylindrical tubes will be deformed toward a polygonal configuration as they absorb shock and are deflected by forces exerted at diametrically opposed points on the cylindrical tube.

Yet another important object of the present invention is to provide a shock absorbing skid assembly which is relatively simple in construction, effective for its purposes of absorbing shock and relatively inexpensive to manufacture.

DESCRIPTION OF THE PREFERRED EMBODIMENT

Figure 1:
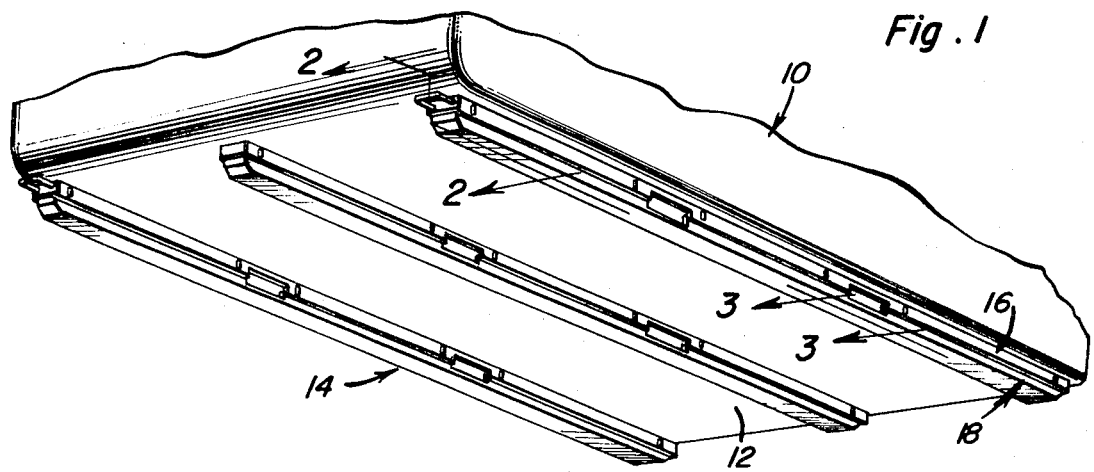
FIG. 1 is a perspective view of a portion of a shelter with a plurality of shock absorbing skids attached thereto.
Figure 6:
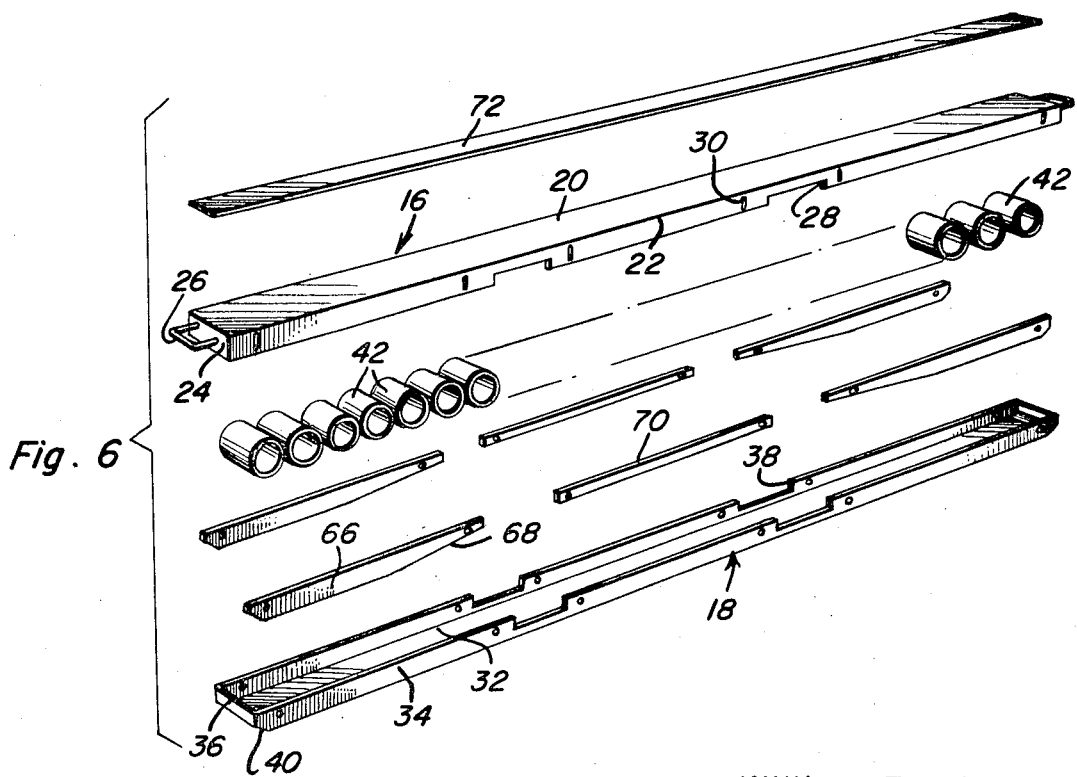
FIG. 6 is an exploded group perspective view of the component of a shock absorbing skid assembly.

FIG. 1 illustrates a container 10 such as a rectangular shelter unit such as those employed to house sensitive electronic equipment employed for various purposes by armed forces. The shelter unit 10 includes a bottom 12 of substantially rectangular planar construction and the bottom surface of the shelter unit 10 includes a plurality of longitudinally extending shock absorbing skid assemblies 14 mounted thereon in laterally spaced relation with the skid assemblies extending from end to end along the bottom 12 of the shelter unit 10.

Basically, each skid assembly 14 includes an upper downwardly facing channel-shaped member 16 and a lower upwardly facing channel-shaped member 18. The upper channel-shaped member 16 includes an upper continuous wall 20, depending side edges or flanges 22 and depending end edges or flanges 24 each of which is provided with a U-shaped loop 26 projecting horizontally outwardly therefrom. Also, the bottom edge of each of the side flanges 22 is provided with a pair of spaced notches 28 for the purpose of receiving the forks of a fork-type lifting device such as is normally employed for handling various types of loads. In addition, the side edges or flanges 22 are each provided with a plurality of vertically extending slots 30 which extend for a substantial portion of the vertical dimension of the flanges 22 but terminate in spaced relation to the top and bottom edges thereof.

The bottom channel-shaped member 18 includes a continuous bottom 32 having upstanding side edges or flanges 34 and upwardly extending end edges or flanges 36. The flanges 34 have notches 38 formed therein for matching registry with the notches 28 to facilitate reception of lifting forks. The end of the lower channel-shaped member 18 are provided with lower inclined corners 40 whereby the skid assembly may serve as a skid for dragging or towing the shelter unit along a supporting surface.

Figure 2:
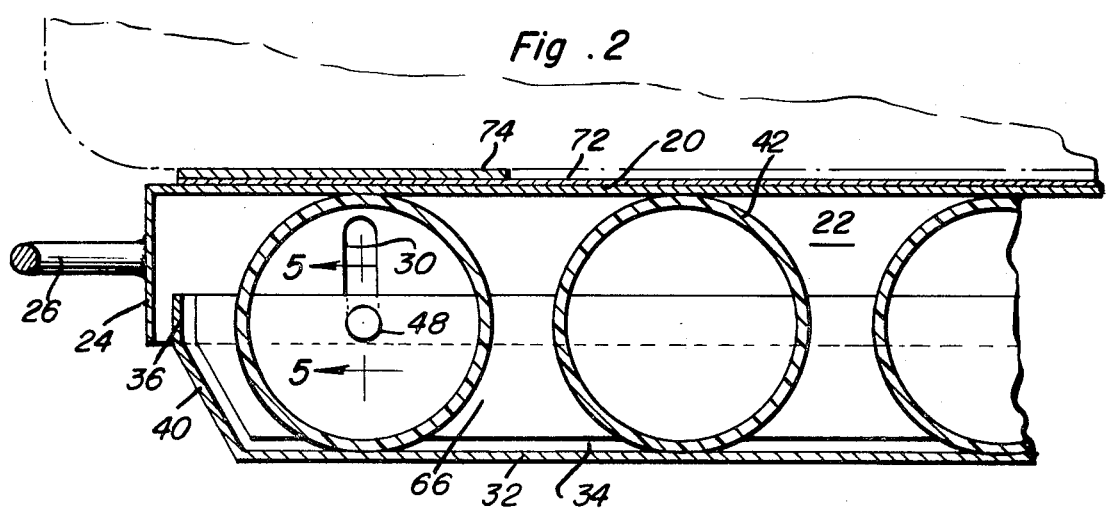
FIG. 2 is a longitudinal, sectional view, on an enlarged scale, taken substantially along a plane passing along section line 2—2 on FIG. 1 illustrating the internal construction of a shock absorbing skid.
Figure 3:
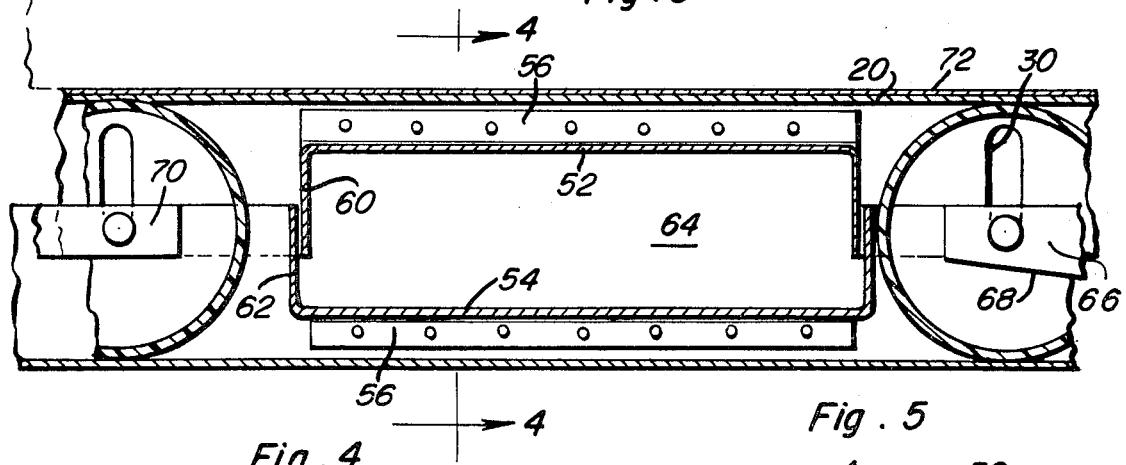
FIG. 3 is a longitudinal, sectional view, on an enlarged scale, taken substantially upon a plane passing along section line 3—3 on FIG. 1 illustrating further internal structural details of the shock absorbing skid.
Figure 4:
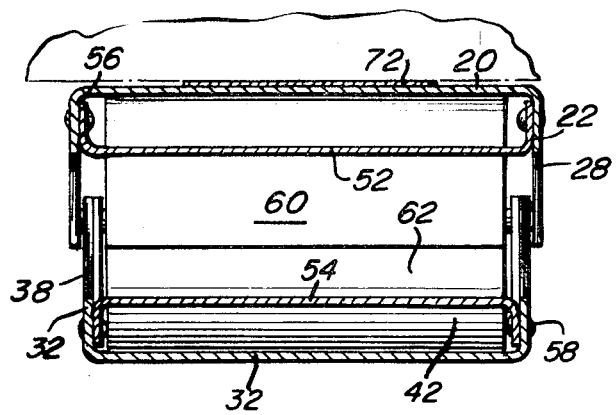
FIG. 4 is a transverse, sectional view taken substantially upon a plane passing along section line 4—4 on FIG. 3 illustrating further structural details of the shock absorbing skid.
Figure 5:
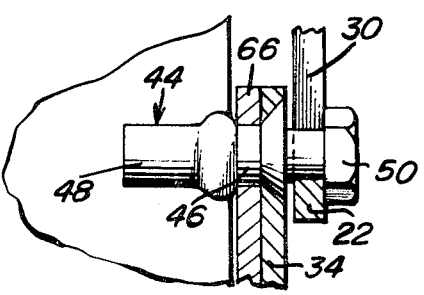
FIG. 5 is a detailed sectional view taken substantially upon a plane passing along section line 5—5 on FIG. 2 illustrating the interconnection between the relatively movable channel-shaped members.

Disposed between the upper channel-shaped member 16 and the lower channel-shaped member 18 is a plurality of cylindrical tubes 42 which are of all the same diameter and length and which extend transversely between the side flanges 34 and 22 and which engage the inner surfaces of the bottom wall or plate 32 and the top wall or plate 20 as illustrated in FIGS. 2-4. The cylindrical tubes 42 are slightly spaced from each other and are cylindrical when in their extended position. When the lower channel 18 moves toward the upper channel 16 such as when a load or shock is imparted thereto, the cylindrical tubes 42 will be deflected into elliptical configuration until the tubes contact each other from which point they will then assume a polygonal configuration with flatened portions occurring where the cylindrical tubes engage the walls 32 and 20 and where they engage each other. The cylindrical tubes 42 may vary in length depending upon the size characteristics of the skid assembly and the diameter thereof may also vary except that when the cylindrical tubes 42 are assembled with the channels, the flanges 34 telescope normally into the flanges 22 with the flanges 22 and 34 being retained in assembled condition by the use of a fastening assembly generally designated by the numeral 44 which extends through the vertically elongated slot 30 in the flange 22 and is rigidly fixed to the flange 34 on the lower channel-shaped member 18 as illustrated in FIG. 5. In this construction, the fastener assembly may be in the form of a pop rivet 46 having a shank portion 48 extending inwardly into the interior of one of the cylindrical tubes. The pop rivet is hollow and receives a fastening bolt 50 which extends through the slot 30 and is threaded into or otherwise secured internally of the pop rivet 46 thus detachably interconnecting the channel-shaped members 18 and 20 so that they may be separated for repair or replacement of components as may become necessary during normal use.

The notches 28 and 38 which define slots for receiving fork lifts are provided with a top partition plate 52 and a lower partition plate 54 which extend transversely of the channels 18 and 20 in alignment with the upper and lower edges of the passageway defined by the aligned notches 28 and 38 as illustrated in FIG. 4. The partition plates 52 and 54 each terminate in laterally extending flanges 56 disposed against the inner surface of the corresponding side flanges 22 and 34 respectively with these flanges being secured to the flanges 22 and 34 respectively by suitable rivets 58 or other fasteners. The end of each of the partitions 52 and 54 have laterally extending plates 60 and 62 which form telescopic closures for the ends of the passageway defined by the partition plates 52 and 54 so that the lift forks will be guided through the passageway 64 on all four sides thereof with the telescopic relation of the plates 60 and 62 enabling the end walls of the passageway 64 to expand vertically.

Also disposed in the lower channel 18 against the inner surface of the side flanges 34 is a plurality of reinforcement or stiffening bars or straps 66 in the form of narrow plate-like elements having a vertical dimension substantially the same as the vertical dimension of the flange 34 and being secured to the flange 34 by the pop rivet 46 as illustrated in FIG. 5. As illustrated, the bottom inner edge of the outermost reinforcing plate 66 is beveled as at 68 and the center reinforcing plates are relatively narrow and designated by numeral 70 with the reduction in the vertical height being commensurate with the buckling loads encountered in the center portion of the channel-shaped members. The reinforcing plates 66 and 70 are for the purpose of resisting buckling loads encountered when resisting shock or when the skid is being pulled over a load surface.

An elongated plate-like shim 72 is provided along the length of the upper surface of the upper channel 16 and reinforcing plates 74 may be provided on the end portions of the upper channel-shaped member 16 for further reinforcement where the device is fastened to the shelter unit. Such fastening to the shelter unit may be provided by rivets or other suitable fasteners and all of the components may be constructed of various rigid metal materials such as aluminum or the like except for the cylindrical tubes 42. The tubes 42 are constructed of a glass fiber reinforced plastic tube in which glass fiber filaments are directionally wound around the shock absorbing tubular member. The longitudinal axes of the tubular member are oriented perpendicular to the length of the channel-shaped members and substantially occupy the full width of the channel-shaped members as illustrated in FIG. 4. While not limited to a particular dimension, tubular members having an outside diameter of 4.75 inches and a wall thickness of approximately 1/10 of an inch have been effectively used for absorbing shock during towing, loading, unloading, and other ground handling operations and also during airborne deployment. As illustrated, the tubular members 42 may deflect to a substantially elliptical configuration before the peripheries thereof engage which will provide a progressive increase in the load or shock absorbing characteristics of the tubular members as the channel-shaped members telescope in relation to each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A shock absorbing skid for mounting along the bottom of a container such as a shelter unit comprising an upper member adapted to be connected to the container and a lower member supported from the upper member for relatively vertical movement and a plurality of shock absorbing members interposed between the upper member and lower member for retaining the upper member and lower member in spaced relation and cushioning shock forces received by the lower member and reducing transmission thereof to the upper member, each of said shock absorbing members is in the form of a resilient tube, said tubes being disposed in spaced parallel relation to each other with the longitudinal axis of each tube being perpendicular to the longitudinal axis of the upper member and lower member.

2. The structure as defined in claim 1 wherein said upper member is in the form of a channel-shaped member having depending flanges and said lower member is in the form of a channel-shaped member having upwardly extending flanges, and means connecting the upper member and lower member together in the form of fasteners interconnecting said flanges, one of said members having vertical slots in the flanges for receiving the fasteners for limiting and guiding relative vertical movement between the members.

3. The structure as defined in claim 2 wherein said flanges are provided with reinforcing plates attached to the inner surface thereof to resist buckling of the flanges.

4. The structure as defined in claim 2 wherein certain of said tubes are aligned with the fasteners, said fasteners extending inwardly into the interior of certain of the tubes for retaining certain of the tubes in predetermined position.

5. The structure as defined in claim 2 wherein said flanges have aligned pairs of notches forming passageways through the skid when assembled in registered relation for receiving the lift elements of a lifting device.

6. The structure as defined in claim 5 wherein the end edges and inner edges of each of the notches are interconnected by plates to define a peripheral wall for the passageways, the plates interconnecting the end edges of the notches being disposed in overlapping telescopic relation to enable relative vertical movement therebetween.

7. The structure as defined in claim 1 wherein said tubes are cylindrical and constructed of directionally wound glass fiber reinforced plastic material, said tubes being spaced from each other when extended and deforming into elliptical configuration when absorbing a load or shock.

8. The structure as defined in claim 2 wherein said tubes are disposed between the flanges with the ends of the tubes being disposed adjacent thereto, said tubes being cylindrical and constructed of directionally wound glass fiber reinforced plastic material, said tubes being spaced from each other when extended and deforming into elliptical configuration when absorbing a load or shock.

9. A shock absorbing skid for supporting a container such as a shelter unit comprising an upper member adapted to support the container and a lower member supported from the upper member for relatively vertical movement and a plurality of shock absorbing members disposed in spaced relation to each other and interposed between the upper member and lower member for retaining the upper member and lower member in spaced relation and cushioning shock forces received by the lower member and reducing transmission thereof to the upper member, each shock absorbing member being in the form of a resilient member, each resilient member being substantially cylindrical with the longitudinal axis thereof being perpendicular to the longitudinal axis of the upper member and lower member, and means interconnecting the upper member and lower member to guide and limit the relative vertical movement therebetween.

10. The structure as defined in claim 9 wherein said resilient members are tubular and spaced apart sufficiently to enable the resilient members to be deformed to oval shape before coming into contact with each other.

* * * * *